WILLIAM W. BOYNTON,
JAMES R. CAMPBELL,
INVENTORS.

BY
Batchelor & Lewis

United States Patent Office 3,410,066
Patented Nov. 12, 1968

3,410,066
RECOVERY OF COTTON AND SIMILAR PLANT PRODUCTS
William W. Boynton, La Canada, and James R. Campbell, Arcadia, Calif., assignors, by direct and mesne assignments, of fifty percent each to William W. Boynton and Leland McCarthy
Continuation-in-part of application Ser. No. 365,731, May 4, 1964. This application Apr. 28, 1967, Ser. No. 641,091
37 Claims. (Cl. 56—30)

ABSTRACT OF THE DISCLOSURE

Plant products such as cotton are harvested pneumatically by moving past the plants a conveyance carrying a plurality of picking tubes. Suction flow is produced in each individual tube under automatic control only in response to detection of a plant product that is within the actual picking range of that particular tube. That is typically accomplished by providing each tube with a valve for controlling the production of inward suction flow, and with a sensor that is selectively responsive to the plant product when the latter is substantially within the effective picking range of the tube end.

---

For harvesting cotton the sensor is preferably a cadmium sulphide photoresistive cell in combination with a source of blue or blue-green light, the source and photocell being restrictively beamed to overlap in a region that coincides predominantly with the region within which the tube can effectively pick cotton. Detection of cotton within that region causes an instantaneous pulse of inward suction flow in the picking tube, drawing in the detected product. The pulse is terminated by disappearance of the cotton from the field of the sensor, or is terminated by a timing circuit that overrides the sensor or acts independently of the sensor. The very short duration of each picking pulse permits the practicable attainment of extremely rapid instantaneous rates of air flow, producing highly effective picking action.

Picking tubes may be fixedly mounted on the conveyance. The disclosure also includes tubes that are projectible to cause the tube end to sweep over a larger effective picking area. Such projection may be periodic or randomly intermittent, or may be controlled individually for each tube, as by a second sensor similar to that already described. In some forms a single sensor controls both projection of a tube and suction flow in it. Structures are also described by which suction control valves are actuated by the tube projection movement.

This application is a continuation in part of the copending patent application Ser. No. 365,731, filed May 4, 1964 and now abandoned by the same inventors and under the same title.

The present invention has to do with systems and methods for recovering plant products, and, although applicable for recovery of other products from their vines, trees or plants, or, when dropped, from plant entanglement or from the ground, it will here be described, illustrative of the invention, as applied specifically to cotton picking from cotton plants. In the following, the term "recovery" will be used in the sense of either original picking or of picking up from entanglement or the ground. The term "product" will be used in the sense of any produce of a plant; and the term "plant" in the sense of any product producer such as tree, vine, plant, etc.

Mechanical cotton pickers now in use are prevalently of a general type which, travelling along a row of cotton plants, scrape or comb the cotton from the plants. Among several main shortcomings of that type of picker is the wastage of cotton which remains entangled in the plants or drops to the ground and is costly of manual recovery. Without detailing other difficulties attendant present picking machines, it is first noted that the present invention provides, as far as known, an entirely new type of system and mechanisms which, travelling along a row of plants, senses the individual cotton locks in the bolls, and, on approach to the lock, draws it in for deposit in a container, leaving the pod portions of the boll on the plant.

Briefly outlined, the system of the present invention, in its preferred embodiments as applied to cotton picking, involves a series of spaced picking units carried on a suitable conveyance which may travel along a row of plants, or between rows. Each unit includes a sensing element such as a suitable beamed photocell or cells. When, in travel, one of the photocells reacts to a cotton lock in its beam it actuates a mechanism either to apply suction to a picking tube or to project a picking tube laterally by a distance suitable for reaching the sensed cotton wherever it may be located laterally in the row. On reaching the sensed cotton the latter is immediately plucked from the boll and drawn into the picking tube by the suction applied to the tube and then drawn by suction from the tube to a storage container. As here illustratively described the picking tube preferably projects or is projected out only a distance sufficient to reach to, or somewhat beyond, the row center, to pick the bolls on one side of the row. Preferably the conveyance carried a spaced series of picking units at each of its lateral sides to recover the cotton from the sides of both adjacent rows as it travels between them. The description here will specifically deal only with the units at one side of the conveyance, those at the opposite side being typically duplicates.

An important aspect of the invention permits a picking tube to pluck cotton effectively from a ripe boll even at an appreciable distance from the tube end. That increase of effective picking range is of critical importance for automatic picking, since a machine cannot place the tube end in precisely alined contact with the cotton lock to be picked, as is possible with hand manipulation of a single picking tube by each operator. Even with projectible pneumatic picking tubes such as have been described, economical automatic picking requires that cotton be plucked from an open pod whenever a tube end or picking orifice comes within some finite spacing, or picking range. The larger that effective picking range can be made, the greater the probability that an array of picking tubes moving past a cotton plant can successfully harvest essentially all of the ripe cotton on the plant.

The present invention has extended the effective picking range of each tube orifice from essentially zero, as in the prior art, to a value that makes automatic pneumatic picking practicable. That has been accomplished largely by automatic control of each picking tube to limit its consumption of power to the very brief periods during which each individual picking operation actually takes place. By thus limiting the power consumption in each tube to time periods of minimum duration, the power that is available for producing suction flow can be expended during such periods at a very high rate. By expending power at a lavish rate, but only during virtually instantaneous and accurately controlled pulses, the rate of suction flow during each such pulse has been made sufficiently rapid to pluck ripe cotton from the boll even at an appreciable picking range from the tube end.

Accordingly, vacuum is only applied to a tube either as it is projected out to reach the sensed cotton, or as it reaches or approaches the cotton, and is then shut off from the picking tube as soon as the tube starts back after sucking in the cotton, or as soon as the cotton is sucked into the tube. And provision is made, either by the fact that the sensing element no longer "sees" the sucked-in cotton, or by automatic timing, to cause a projected tube to be withdrawn immediately after projection, to avoid dragging the plants and also to prepare the tube for any possible immediately subsequent projection to pick cotton from another boll.

In the various preferred forms described below, projection of a suction tube is under the control of an element, specifically a photo tube, which senses the presence of a lock of cotton in position to be reached by the suction tube. Suction is then applied to the tube either as it moves outward or as it reaches the lock of cotton. As will be hereinafter explained the suction tube, although preferably projectible, may permanently project obliquely from the conveyance, or may be fixedly mounted in any other desired position, with suction applied to it only when its outer open suction end approaches a lock of cotton closely enough to draw it in. If projectible, the tubes may be projected intermittently without individual selective control of the projection movement, such control then applying only to individual energization of the suction flow in each tube. The invention includes mechanism for improved control of the intermittent projection of such tubes, providing variable frequency of projection with or without variation of the projection duration.

Many aspects of the present invention are useful regardless of the specific means employed to produce suction flow in the picking tubes. The prior art describes manually controlled cotton picking devices in which suction flow into a picking tube is produced by injector action of a pressurized air jet emitted from an inwardly directed nozzle within the tube. Such injector action produces a partial vacuum in the picking tube just outward of the jet nozzle, drawing air into the outer end of the tube in much the same manner as when the inner end of a picking tube is connected to a vacuum conduit. Examples of manual cotton picking devices using such injector action are described in Patents 2,653,438 to Ramirez and 2,688,835 to Rawson.

A pneumatic cotton harvesting mechanism which carries out certain aspects of the present invention in a particularly effective and useful manner is described in connection with FIGS. 17 to 20. Other aspects of that mechanism are more fully described and claimed in the copending patent application Ser. No. 488,198, filed on Sept. 17, 1965, by William W. Boynton, one of the present joint inventors.

These and other features of the invention will be best understood from the following detailed descriptions of preferred and illustrative embodiments. Reference is made to the accompanying drawings, largely schematic, illustrating typical illustrative embodiments of the invention.

In the drawings:

FIG. 6 is a detail section of the modified type of picking tube unit shown in FIG. 2a;

FIG. 7 is an elevational view taken as indicated by line 7—7 on FIG. 6;

Figure 1:
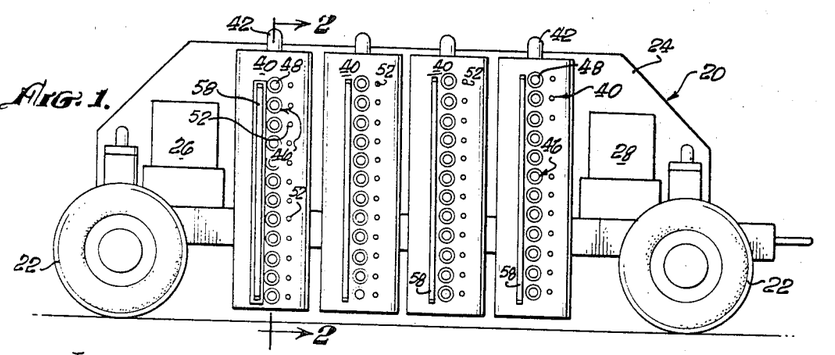
FIG. 1 is a schematic side elevation illustrative of a conveyance carrying a spaced series of recovery units.

Reference is first made to FIGS. 1, 2, 3 and 4. In FIG. 1 a conveyance 20 is shown with running gear 22 and body 24. An air compressor 26 and vacuum pump 28 may be located on the frame of the conveyance in body 24 and driven by any suitable source of power; or they may be located on a towing vehicle. Likewise the storage container shown schematically at 30 in FIG. 2b may be located in or form a part of conveyance body 24, or may be located on a towing vehicle. As indicated in FIG. 2b vacuum pump 28 may be applied to container 30 and draw suction air from the picking units 46 connected to the conduit chambers 40 and thence through 40, 42 to 30.

Figure 2:
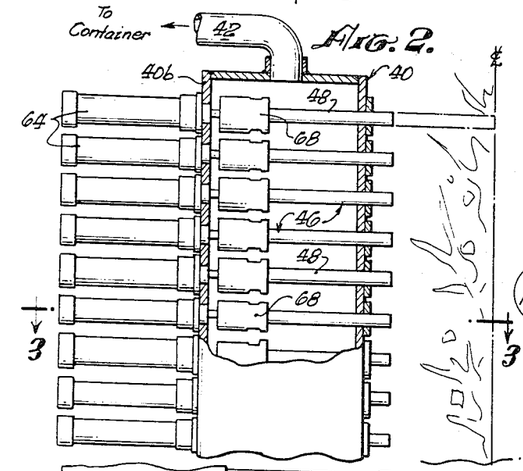
FIG. 2 is a partial section on line 2—2 of FIG. 1, showing the type of picking tube unit shown in FIG. 4.
Figures 2A, 3:
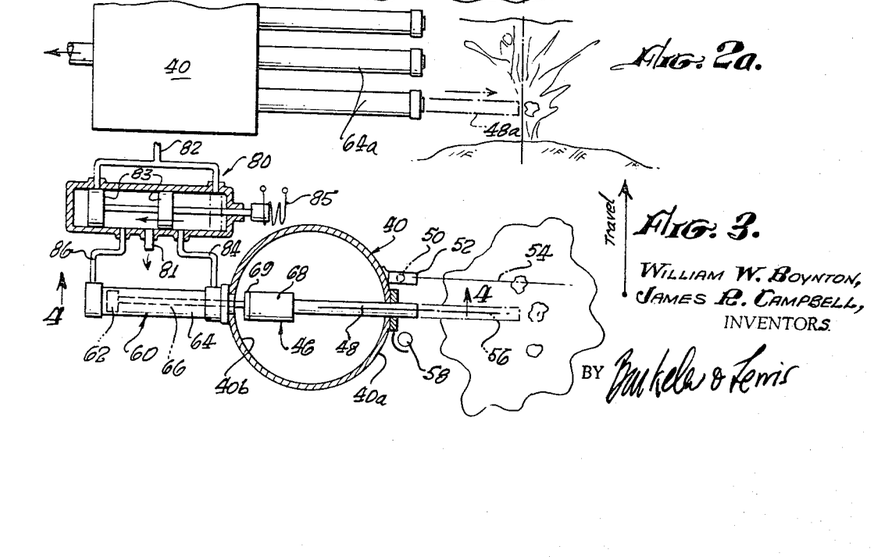
FIG. 2a is a fragmentary elevation, similar in aspect to FIG. 2, showing the modified picking tube unit shown in FIG. 6.
FIG. 3 is a section on line 3—3 of FIG. 2 and showing schematically the air pressure feed and valvular control of the tube projecting cylinder.
Figure 2B:
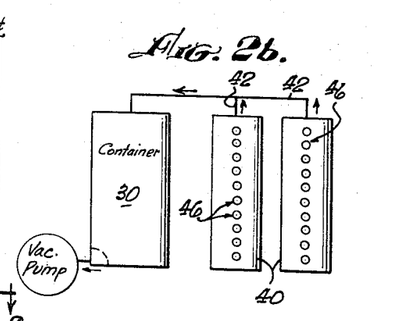
FIG. 2b is a schematic indicating the suction connections of the system.

On the side of the conveyance body shown in FIG. 1, a plurality of closed conduits in the form of vacuum chambers 40 may be mounted, with vacuum pipe connections 42 to the container 30, as shown schematically in FIG. 2b. As here shown illustratively, pipes 42 lead from the upper ends of chambers 40, but may lead from their sides or bottoms. Each of these several closed vacuum chambers 40, one of which is fragmentarily shown in FIG. 2, is equipped with a vertically spaced series of picking tube units 46, with their projectible tubes 48 of the several chambers 40 preferably located in vertically staggered positions as indicated in FIG. 1. For the prevalent height of cotton plants the uppermost unit of each vertical series may be, say, about forty inches above ground level, the lowermost close to ground level or inclined out and downwardly toward the ground; and typically, the vertical spacing of the units in each vertical series may be, say, about three inches.

Alongside and at the level of each projectible tube 48 a photocell 50 is here shown mounted in a beam restricting tube 52. See FIG. 3. As later explained, there may be more than one such cell unit. For an average conveyance travel speed of about 2 m.p.h., to allow for time delay in tube projection, the horizontal spacing of photocell beam axis 54 in the travel direction ahead of tube axis 56 is about 1½ to 2 inches and the included angle of the photocell beam is about 10°. Illumination elements such as indicated at 58 may be located on each vacuum chamber 40 alongside the picking tubes. With that lighting arrangement, cotton within the photocell beam is illuminated more brightly close to the photocell than farther away from it. That variation of illumination facilitates adjustment of the photocell sensitivity so that it will respond only to cotton within the effective picking range of unit 46. When that unit comprises a projectible tube its effective picking range, of course, includes both the length of the projection stroke and the picking radius about the tube end from which cotton can be effectively plucked and drawn into the tube by suction flow.

Lighting sources 58 are represented in FIGS. 1 and 3 as conventional fluorescent tubes, preferably those of the blue type, such as those made by General Electric Company under the designation F–30–T–12/B/RS, which are rich in wavelengths in the blue and blue-green portions of the spectrum. Photoconductive cells having a sensing element of cadmium sulphide have a sharp peak of sensitivity at about 5000 angstroms. Illustrative of such cells are those made by Radio Corporation of America under the designation C–32075. The response peak of such cells lies within the intense blue-green emission of the described light sources, and enables the photocells to selectively react with high sensitivity to the white cotton locks, without comparable sensitivity to other parts of a cotton plant or the pods of the cotton bolls. The cotton pods, in particular, have been found to have surprisingly high reflectivity at longer wavelengths, especially in the red region of the spectrum, whereas in the blue and bluegreen all portions of the plant have markedly lower reflectivity than the ripe cotton.

Figures 4, 5, 10A:
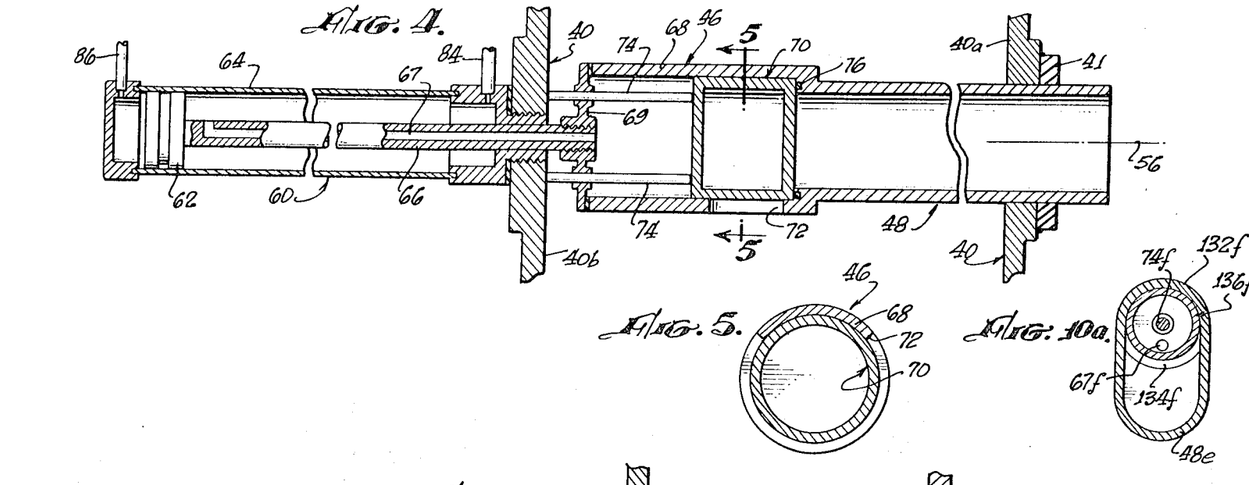
FIG. 4 is a fragmentary detail section on line 4—4 of FIG. 3.
FIG. 5 is a section on line 5—5 of FIG. 4.
FIGS. 10 and 10a, similar to FIGS. 8 and 9, but showing the full unit, show a modification of the valve form of FIGS. 8 and 9.

FIGS. 3 and 4 show one illustrative type of projectible picking tube unit 46 with its projectible open ended suction tube 48, and its projection piston-cylinder unit 60. Piston 62 in cylinder 64 has its piston rod 66, projecting through the back wall 40b of chamber 40, rigidly connected to the rear end of a cylindric valve casing 68 whose forward end is rigidly connected to the rear end of picking tube 48. Within valve casing 68 a cylindric tubular valve member 70 slides between the forward position shown in FIG. 4 and a rear position against the rear end 69 of casing 68. In the forward position valve 70 closes the port 72 in casing 68 shutting off vacuum from the interior of 40 to the interior of the open ended picking tube. With the picking tube withdrawn to the rear (position of FIGS. 3 and 4) rods 74 mounted or contacting at their ends on wall 40b of chamber 40 and sliding through 69 press their other ends against valve 70 to hold it tightly against a seal 76 at the forward end of casing 68. In this position the forward open end of picking tube 48 extends slidingly through forward wall 40a of chamber 40 and through a seal indicated at 41.

FIG. 4 also shows how pressure air from the forward end of cylinder 64 may be admitted through passage 67 in the hollow piston rod 66 to the interior of 68 to press valve 70 forward and hold port 72 closed. As will become apparent, pressure is present at the forward side of piston 62 during retraction of tube 48, so that the pressure admitted to 68 tends only to hold valve 70 forward during the retraction stroke. Valve 70 of FIG. 4 moves by inertia to the forward position in which it closes vacuum port 72 during the retraction stroke of the tube 48. In FIG. 4 the rods 74 hold valve 70 closed tightly when the tube reaches its fully retracted position. And the pressure admitted from cylinder 64 tends to hold valve 70 closed tightly throughout the retraction stroke. During the projection stroke of the tube 48, the valve moves by inertia to the left of the position shown in the figure to open port 72 and admit suction to the tube. During that projection stroke cylinder 60 forward of piston 62 is connected to exhaust.

Figures 13, 14, 15, 16:
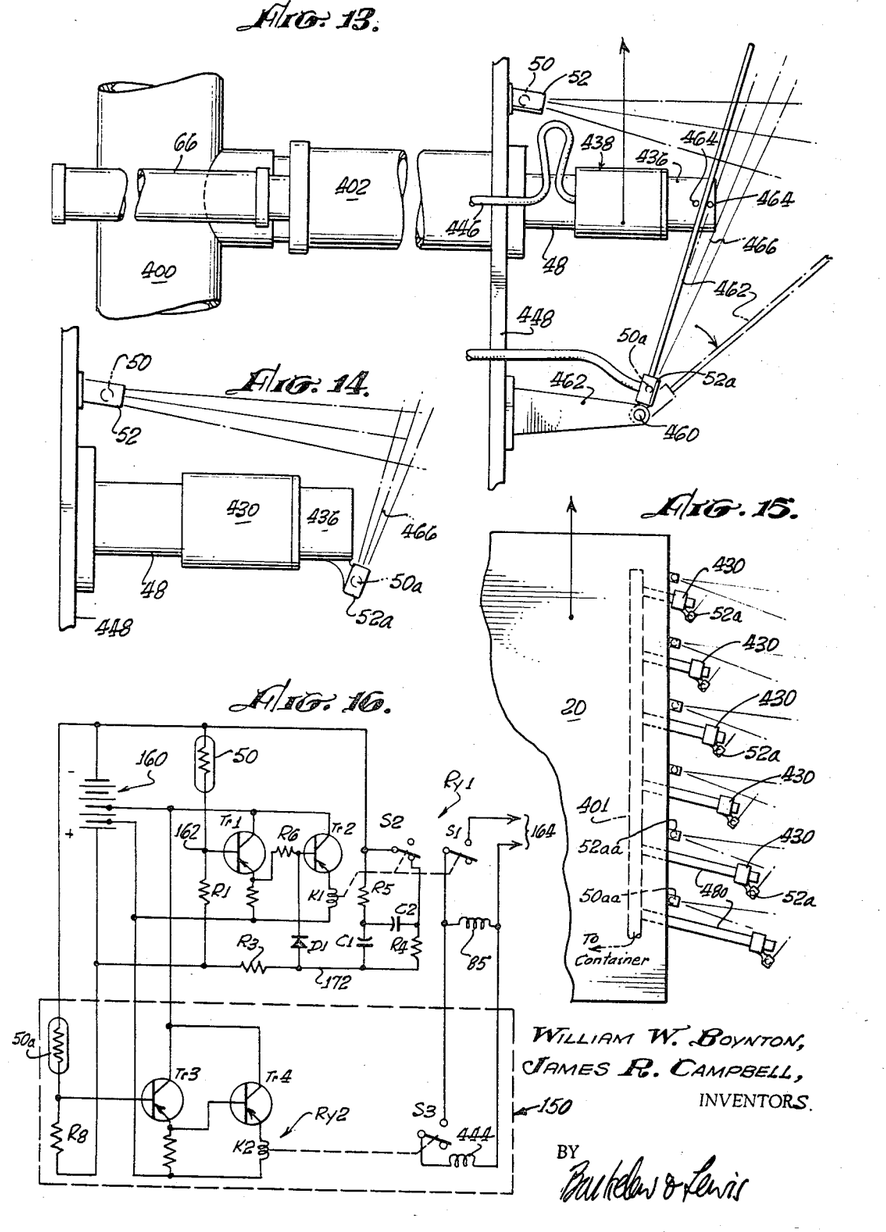
FIG. 13 is a schematic showing one form of scanning cell mounting applied to the form of FIG. 12.
FIG. 14 shows a variant of that scanning cell mounting.
FIG. 15 is a schematic illustrating a system employing a series of projecting picking tubes with cell control as, e.g., in FIG. 14.
FIG. 16 is a diagram of a typical control system.

FIG. 3 shows schematically a solenoid actuated valve 80 with pressure feed pipe 82, exhaust 81 and pressure pipes 84 and 86 to the two ends of cylinder 64. The moving element 83 of the valve may be biased in the direction indicated to normally feed pressure to 84 to the forward cylinder end to hold the picking tube retracted and to open 86 to exhaust 81. Solenoid winding 85 when energized moves 83 to the right in the figure to connect 84 to exhaust and 86 to the pressure feed. Solenoid valve 80 functions normally, when cell 50 is not reacting, to admit air pressure from pressure line 82 to cylinder line 84 forward of piston 62 to hold the picking tube retracted in the position of FIGS. 3 and 4. When cell 50 senses a cotton lock and reacts to increase its conductivity, the control system (see FIG. 16) has, as its over-all function, energization of the solenoid actuated valve to admit pressure from pressure line 82 to cylinder line 86 behind piston 62 to drive the piston to the right in those figures and project the picking tube to such a projection as indicated in broken lines in FIGS. 2 and 3. Valve 80 also functions to exhaust pressure from that side of the piston opposite that to which pressure is admitted from pressure line 82. Valve 80 may be either directly solenoid operated, or operated from a pilot pressure valve that is solenoid operated. The preferred details of the electrical control system shown in FIG. 16 are described below.

The sequence of operations of the system as so far described is as follows. As the conveyance with its several recovery units moves along a row of cotton plants one or more of the beams of cells 50 moves onto the cotton in a boll. The cell then reacts to the light reflected from the boll and, through a control system such as in FIG. 16, immediately energizes solenoid winding 85 of control valve 80. The spacing of the cell beam forward of the line of tube projection is such that, at the adopted rate of conveyance travel, the line of tube projection is, after its time delay of projection, either directly toward the sensed cotton, or close enough to it, that the suction then applied to the tube draws the cotton in. When the cotton disappears into the tube, cell 50, no longer seeing it, is de-energized and de-energizes solenoid winding 85, resulting in valve 80 throwing to its position to withdraw the tube.

As the tube and its attached valve casing 68 move out in projection, suction valve 70 moves to the left in casing 68 by inertial action, opening suction port 72 to the vacuum maintained in chamber 40. Even if on outward tube movement the valve by inertia has come up against the rear casing wall 69, and thus, moving outward with the tube, inertially continues its outward movement when the outward movement of the tube stops, the time interval of such outward valve movement is sufficient to allow cotton to be drawn into the tube at the end of the outward stroke. Suction is thus applied to the tube during its outward stroke and during at least part of the dwell at its fully projected position. As described below that dwell is preferably quite short. With the cotton drawn into the tube and (among other control actions—see below) when the cell 50 no longer "sees" the cotton, the control system, de-energizing solenoid 83, immediately acts to throw valve 80 to operate the piston 62 to retract the picking tube. As soon as the tube starts retraction, if the inertial valve 70 has not already moved relatively forwardly, it moves relatively forward and closes suction port 72. During the interval between initial sucking in of the cotton and closure of port 72 that particular cotton lock may or may not have emerged through port 72 into chamber 40. If not, it along with previously sucked in locks are eventually sucked into chamber 40 on repeated suction actions of the picking tube. For instance, instead of an individual lock being immediately sucked through the tube and out through port 72, the tube may be more or less full of cotton locks previously drawn in, but each time port 72 is opened one or more of those locks will be drawn through the port into chamber 40. The locks in chamber 40 are drawn by the suction current into such conduits as 42 and thence into the storage receptacle 30.

Figures 6, 7:
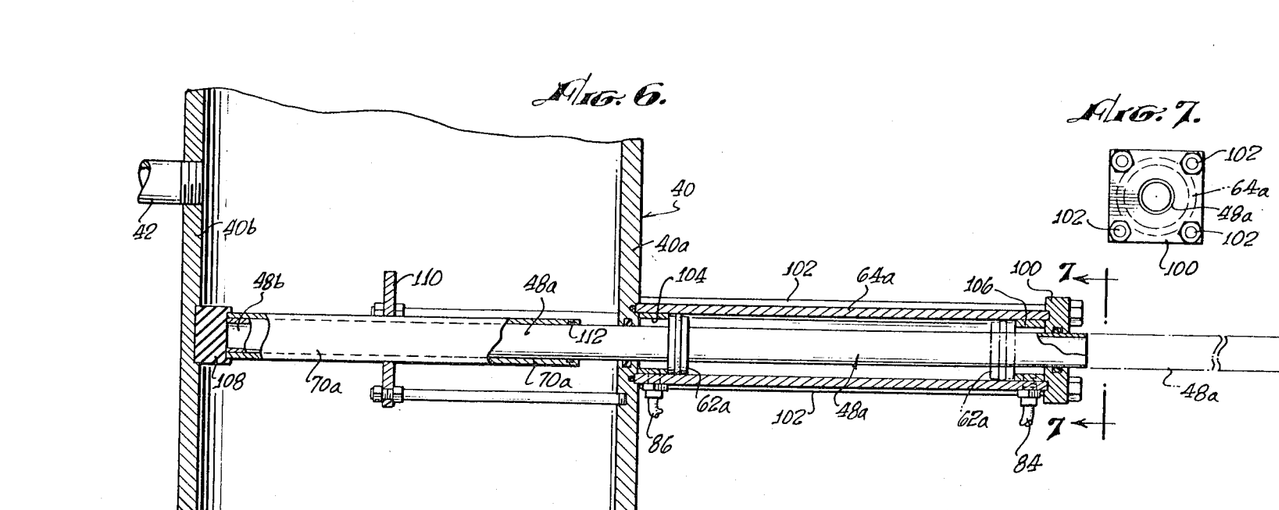

FIGS. 2a and 6 show a modified form and design for the picking tube unit. In this form the suction tube 48a normally projects outward of suction chamber 40 and is projected further out as indicated in broken lines under the same controls as have been described. In this form picking tube 48a is normally within cylinder 64a with its outer end extending through cylinder head 100, the head being sealingly held back against the cylinder end and the cylinder being sealingly held back against the wall 40a of 40 by suitable rods 102 attached to that wall 40a. Within cylinder 64a tube 48a has an annular piston 62a which normally stands at the inner end of the cylinder against a resilient buffer 104. At the outer end of the tube projection stroke piston 62a comes up against another such buffer 106. Piping connections 84 and 86 to cylinder 64a and control valve 80 may be the same as in FIG. 3, and the valvular control system may be the same as previously outlined.

In its normal retracted position shown in full lines in FIG. 6 the rear or inner end 48b of tube 48a presses against a sealing buffer member 108 mounted on the opposite wall 40b of 40. A valve tube 70a slidingly surrounds tube 48a and also normally seats its inner end against 108. A supported guide plate 110 guides valve tube 70a and the inner end portion of tube 48a. A seal, such e.g., as an O-ring 112 in valve tube 70a creates sufficient friction between 70a and 48a to move valve tube 70a outwardly off its seat on 108 as picking tube 48a starts out, the outer end of 70a coming up against wall 40a of chamber 40. With both tubes 48a and 70a unseated from buffer 108 suction from the interior of 40 is applied to the picking tube on its outward stroke of projection. During the first part of the retraction stroke of the picking tube, the friction at 112 carries valve tube 70a back to seat on 108 and that seating largely if not wholly cuts off the suction to the inner end of tube 48a. Then, on final retraction of 48a its inner end 48b seats forcibly on 108 to tightly cut off the vacuum. As in the form of FIGS. 3 and 4 air pressure on the outer face of the operating piston forcibly holds the picking tube in its normal retracted position until the valvular control system reverses the air pressure on the piston to project the tube.

Figure 8:
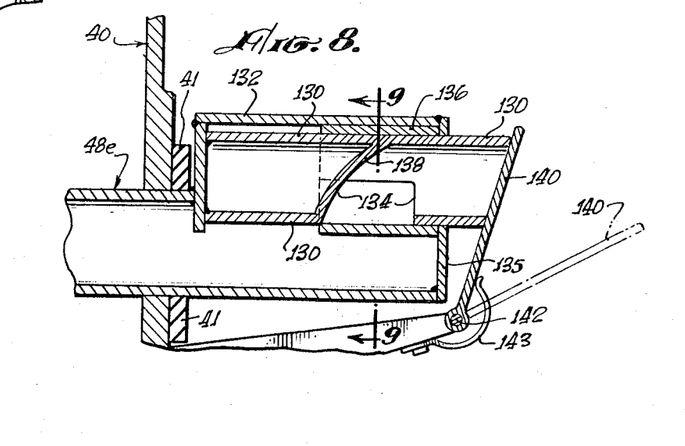
FIG. 8 is a detail section showing a vacuum control valve at the outer end of the picking tube.
Figure 9:
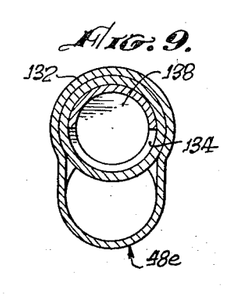
FIG. 9 is a section on line 9—9 of FIG. 8.

FIGS. 8 and 9 show another type and location of a suction controlling valve that may be applied to the picking tubes of any of the types here shown and described. In these figures the outer end 48e of a typical picking tube (e.g., the outer end of such a tube as 48 in FIGS. 3 and 4, or 48a in FIG. 6) is shown as equipped with a suction controlling valve at that outer end. Such location of the suction control has the advantage that the vacuum in the picking tube itself is not dissipated at the end of each picking operation. It will be understood that the outer end valve of FIG. 8 takes the place of valve 70 in FIG. 4 and of the valvular action at 108 in FIG. 6: the inner end of the suction tube being constantly open to the vacuum. This omission of the valve at the inner end of the tube is shown in FIG. 10.

As shown in FIGS. 8 and 9, the outer tube end has a short off-set tubular valve guide 130 integrated with the tube end and spacedly surrounded by a lateral tubular extension 132 of the tube end. Valve guide 130 has a port 134 near its forward end where it further forwardly projects out through a closure plate 135 that closes the end of tube 48e and its lateral extension 132. An inertial sliding sleeve valve 136 surrounds the ported valve guide 130, taking the position shown in FIG. 8 to close port 134 when the tube 48e is retracted and sliding to the left in that figure to open port 134 when the tube is projected. The tubular valve guide member 130 projects its open end forward of closure plate 135. The cotton is sucked in at that open forward end and a deflector 138 deflects the cotton through port 134 into the forward end of tube 48e.

FIG. 8 also shows a flap valve 140 pivoted at 142 on a part fixed with relation to chamber 40 and biased toward the full line position of FIG. 8, for instance by spring 143. When the picking tube is projected it pushes the flap valve to an outer position such as shown in broken lines in that figure. On tube retraction the bias of the flap valve throws it to the full line position to close the open end of tube 130. This flap valve may be applied to the outer end of any of the described picking tubes to close the tubes at their outer ends when retracted, and can be used with or without the sliding valves such as of FIG. 4 or 6.

Figure 10:
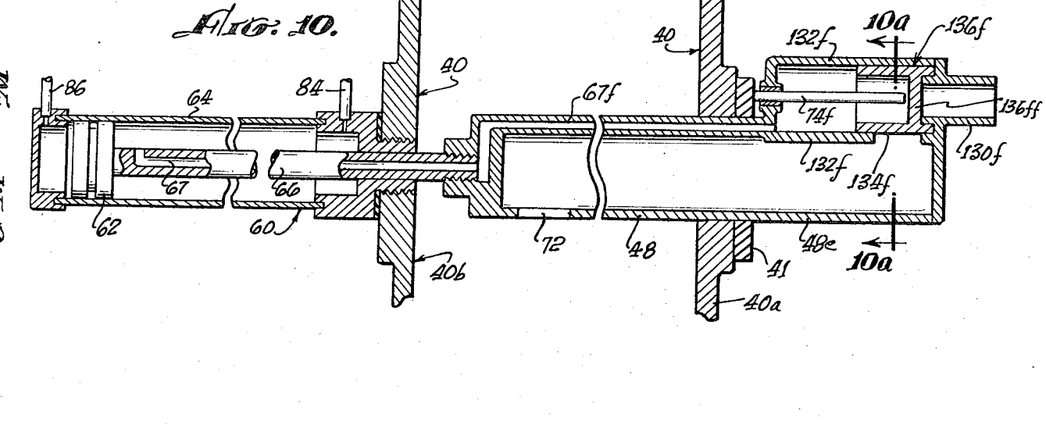

FIGS. 10 and 10a show a modification of the valvular arrangement of FIG. 8. In these figures the lateral extension 132f of the outer end 48e of tube 48 of FIG. 4 is completely cylindric and the tubular inertial valve 136f slides longitudinally in 132f between the outer position shown, where it closes port 134f in 132f, and a position to the rear of that shown where it opens port 134f. In its outer position its transverse wall 136ff also closes the inner end of tube 130f which has an open outer end. The inertial action of valve 136f is the same as that of valve 136 in FIG. 8. To hold valve 136f tightly closed in the position of FIG. 10 when the picking tube 48 is retracted, a rod 74f, bringing up against e.g., a wall of chamber 40, may hold valve 136f out. In FIG. 4, the inner ends of rods 74 may similarly bring up against chamber wall 40b instead of being secured to that wall.

FIG. 10 also shows, more or less schematically, how valve 136f may be pressed out to the position of the figure by pressure from the actuating cylinder 64. As shown here passage 67 in hollow piston rod 66 communicates with a passage 67f formed in the wall of tube 48 and leading to the interior of casing 132f behind valve 136f. As in FIG. 4 the pressure from cylinder 64 thus presses valve 136f forward on the retraction stroke.

Figure 11:
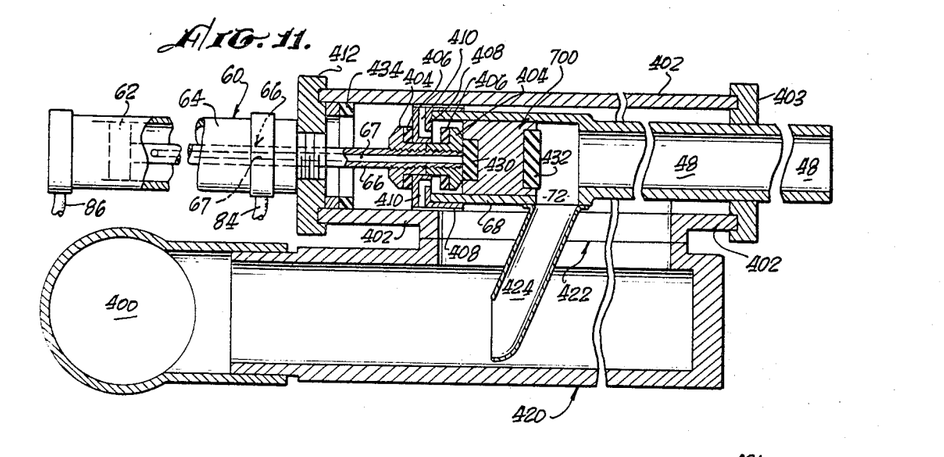
FIG. 11 shows a further modification of valvular action at the inner end of the projectible picking tube, and also the schematic connection of that tube to an offset vacuum manifold instead of directly to a manifold in the form of such a vacuum chamber as in FIG. 3.

FIG. 11 shows a suction tube unit and valve form generally similar to that of FIG. 4 but designed to connect it offset relation to a vacuum conduit or manifold instead of directly to a conduit vacuum chamber such as 40 in FIGS. 2, 2a and 2b. Vacuum manifold 400 shown here in the form of a pipe may be of either horizontal or vertical extent. If vertical, FIG. 11 may be regarded as a horizontal section and manifold 400 will carry a vertical series of the tube and valve units of the type shown here. And there may be a plurality of horizontally spaced manifolds with their vertically spaced tube units; generally similar to the arrangement shown in FIG. 1. Assuming the manifold to be vertical, it or several of them carrying their vertically spaced picking tube assemblies, may be mounted on the conveyance in the same general manner as shown schematically in FIG. 1 for the conduit vacuum chambers. The manifolds will, like those chambers, be vacuum-connected through the cotton container to the vacuum pump. The tube, valve and projecting cylinder are here similar to those of FIG. 4, but with a mounting that offsets the projecting cylinder from the manifold pipe 400 so as to make the over-all lateral dimension between the manifold and the outer fixed parts of the tube mounting a minimum.

As shown here, tube 48, sliding at its inner end in casing 402, projects out through casing head 403 and carries valve casing 68 at its inner end. Inertial valve 700 slides in valve casing 68, opening port 72 when to the rear, closing that port when forward. The projecting cylinder-piston unit 60 is here shown the same as in FIGS. 3 and 4 with the same numerals. The piston rod 66 is hollow with a passage 67 as in FIG. 4, and the tube projection action is the same as has been described for FIGS. 3 and 4.

Instead of the piston rod 66 connecting directly to valve casing 68 as in FIG. 4, that rod as shown here carries at its outer end a pair of spaced heads 404 with buffer and sealing disks 406 which play at opposite sides of a ported head member 408 attached to valve casing 68. Head ports 410 lead between the outer face of head member 408 where they communicate with the interior of casing 68 behind valve 700, and the outer periphery of 408. Head 408 fits loosely in 402 or has external grooving allowing the vacuum that is present in 402 around tube 48 and its valve casing 68 to reach the space in casing 402 that lies between tube head 408 and the inner casing head 412. Ports 410 are thus in communication with that interhead space.

Casing 402 is mounted on a hollow adapter 420 whose interior communicates with the manifold 400. Elongated port 422 leads between the interiors of casing 402 and the adapter, that port being of a length accommodating the tube-stroke of a cotton deflector 424 attached to valve casing 68 at its port 72.

FIG. 11 shows suction tube 48 in the early part of its outward projection stroke. Piston rod 66, moving outward, has moved the left hand head 404 against valve casing head 408, and has moved the right hand head 404 away from the right hand face of 408 and opened ports 410. In this position, the right hand head 404 presses against a sealing buffer member 430 in the left hand face of valve 700 which is then, by inertia, to the left. That sealing prevents pressure air flow through hollow piston rod 66 during the outward stroke. On the succeeding inward stroke, the sealing buffer 406 of the right hand head 404 moves against valve casing head 408 and closes ports 410 at the time that air pressure from the outer end of operating cylinder 64 enters casing 68 through the hollow piston rod behind valve 700 to move and hold it in outer position to close valve port 72 and to press its seal 432 against the shouldered end of tube 48. At the end of the inward retraction stroke valve casing head 408 comes up against the sealing buffer 434. The fact that vacuum from the manifold is always freely present between head 408 and head 412 allows the valve casing head with its valve casing and attached suction tube to move freely in and out.

Figure 12:
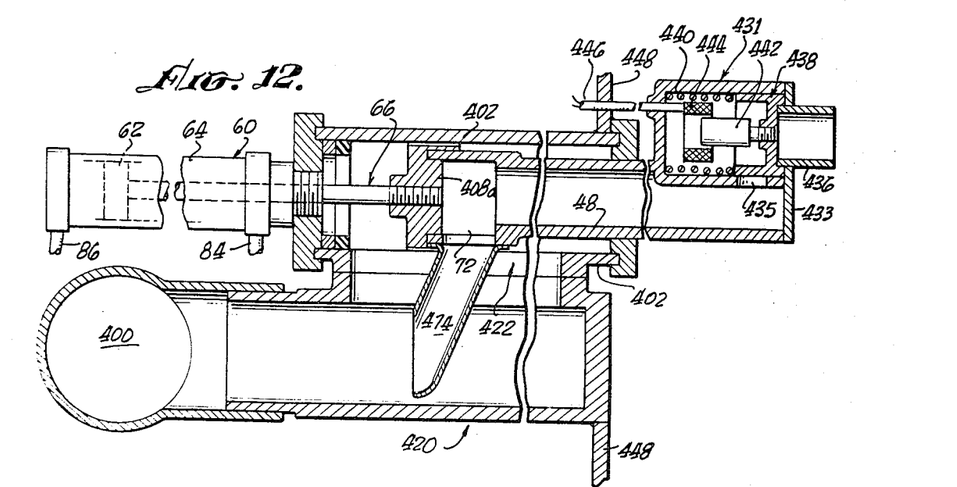
FIG. 12 shows a further modification in which a valvular action at the outer end of the picking tube is controlled in action by a photocell here called the scanning cell.

FIG. 12 shows a variant of the form of FIG. 11, with the suction controlling valve mounted at the outer end of the suction tube, similarly to the valve position in FIGS. 8, 10 and 11. However, as shown here in FIG. 12, that suction controlling valve is solenoid actuated under the control of a second photocell, here called the scanning cell. In FIG. 12 the main parts of the design are the same as in FIG. 11 and are given the same numerals.

Here, valve 700 of FIG. 11 being eliminated, solid piston rod 66 is directly attached to inner head 408a of suction tube 48. The outer end of tube 48 carries an offset tubular valve guide 431 much like that in FIG. 10, that guide and the outer end of tube 48 being closed by plate 433 carrying the effective outer end 436 of the suction tube. Valve 438 closes port 435 and the inner end of 436 when in the outer position shown in the figure, being biased to that position by spring 440. The valve rod carries a solenoid armature core 442 which solenoid winding 444 pulls back when energized to pull valve 438 to the left to unseal tube 436 and uncover port 435. Connection to the solenoid winding is shown as by a two-wire flexible cable 446, shown as passing through a wall 448 which may be the wall or other part of the body of the conveyance of FIG. 1. It will be understood that the solenoid actuated vacuum valve may be located at any point where it controls suction to the outer end of the picking tube; for example, in the position of valve 700 of FIG. 11 or 70 of FIG. 4.

FIG. 13 shows schematically an application of a scanning cell to such a picking tube assembly as shown in FIG. 12. As here shown the scanning cell 50a, in its beam restricting tube 52a, is pivotally mounted at 460 on a bracket 461 which may be attached to any fixed part of the conveyance, as to the wall indicated at 448. A rod 462 passing between two pins 464 on the outer end of picking tube 436 keeps the scanning cell beam 466 centered just ahead of the front open end of 436. Thus, the scanning cell "sees" and reacts to a lock of cotton at or near the open suction end of tube 436 and ceases reaction as soon as the cotton is drawn into the suction tube. Cell reaction causes energization of solenoid winding 444 to open the suction valve 438, the valve closing immediately on the cell ceasing reaction. The beam 466 of the scanning cell is preferably narrower, say of 5°, than the beam of the primary cell 50.

FIG. 14 indicates another mounting for the scanning cell 50a. Here the beam restricting tube 52a that carries the cell is shown permanently mounted on the front of suction tube 436 with its beam projected across the front open end of that tube. Thus the beam moves with the projection movement of the tube as in FIG. 13, maintaining a fixed relation to the picking orifice of the tube.

The projection movement of the picking tubes may be controlled, if desired, independently of the presence of plant product in any specific location. For example, the tubes may be so driven that they reciprocate in and out of the plants intermittently in accordance with a predetermined program. An illustrative programming system is represented schematically in FIGS. 17 and 18. The shaft 480 is driven continuously by the motor 481, which is preferably controllable in speed, as by the conventional control device shown schematically at 482. Shaft 480 carries a number of cam disks 483, each of which has one or more cam segments 484. A plurality of lever switches 486 are mounted in position to be operated by the respective cam disks. Several switches may be mounted at adjustable angular intervals about a single disk. The numeral 485 designates generally the combination of such a switch and its operating cam.

Figure 17:
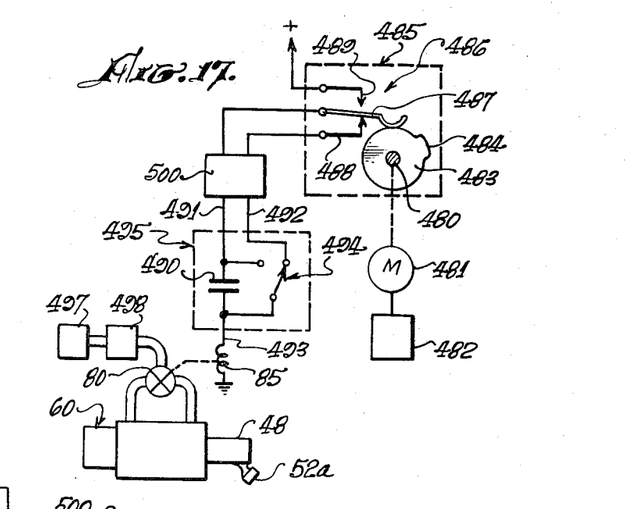
FIG. 17 is a schematic diagram illustrating an alternative manner of controlling tube projection.

As shown typically in FIG. 17, each switch 486 has a switch arm 487 that is directly engaged by the cam, a normally closed contact 488 and a normally open contact 489. Direct current power is supplied to contact 489. Switch arms 487 and 488 are connected via a program selection network 500, described more fully in connection with FIG. 18, and the respective lines 491 and 492 to the timing circuit 495. Line 491 is connected to one side of the capacitance 490, while line 492 is connected via the switch 494 to the other side of that capacitance and also to output line 493 and thereby through the solenoid winding 85 to ground. In normal position of cam switch 486, as illustrated, capacitance 490 is discharged through closed switch contact 488. On switch actuation, the charging current to the capacitance energizes solenoid 85. Solenoid 85 operates the valve 80, which directs air pressure from the source 497 to piston and cylinder 60, projecting the picking tube 48 in response to solenoid current and retracting the picking tube when the current is cut off, all as more fully described in connection with FIG. 3, for example. A photocell housing 52a is mounted on picking tube 48 for controlling application of suction flow to the tube, as already described in connection with FIGS. 13 and 14.

The speed of travel of the picking tube in its projection and retraction movement depends upon the air pressure supplied to valve 80, which may be either greater or less than atmospheric pressure, and is controllable by the pressure regulator indicated at 498. The number of projection cycles per second is determined by the number of cam segments 484 on disk 483 and by the speed of cam rotation, adjustable at 482. The relative timing, or phase relation, of projection of one tube with respect to another is controllable by selection of the relative phase in which the respective cams engage the switches that control those tubes. The projection movements of the respective tubes are preferably predominantly out of phase with each other. The duration of each projection stroke is determined electrically by the time required to charge capacitance 490 through the valve solenoid, and is variable by selection of those components and of a series resistance if required. With such a timing circuit, the time course of each projection movement is independent of the rate of cam rotation. Actuation of switch 494 by manual or other means eliminates capacitance 490 and contact 494 of the cam switch from the circuit. Solenoid 85 is then energized directly by cam switch arm 487, so that the duration of the projection movement varies inversely with the rate of cam rotation. The projection duration is then a uniform fraction of the cyclic period. If that type of operation is preferred under all conditions, timing circuits 495 may be entirely omitted, together with all portions of selection circuits 500 that have to do with connecting lines 492 to cam switch contacts 488.

Figure 18:
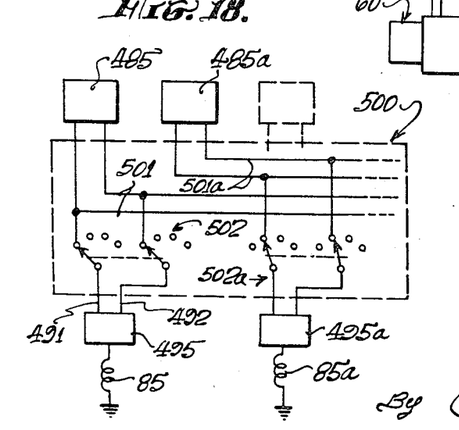
FIG. 18 is a schematic diagram illustrating further aspects of the system of FIG. 17.

Program selecting network 500 of FIG. 17 may provide any desired degree of flexibility in the interconnections between the several cam mechanisms 485 and the several picking tubes. Whereas for many purposes it is sufficient to provide more or less permanent connections, FIG. 18 represents an illustrative switch network which permits useful variety of control and is representative of a wide range of possible networks. The selection switches 502, 502a, etc., comprise pairs of ganged rotary switches with their switch arms connected to the respective input lines 491, 492 of the several timing circuits 495. Each switch has a plurality of contacts which are connected to the output lines from the respective cam devices 485, 485a, etc., via the bus lines 501, 501a, etc. With such an arrangement, each picking tube may be connected to any selected one of the cam devices, which may, for example, provide a selected variety of different projection periods, different projection durations and different phase relationships. Similar switch banks may be arranged, if preferred, to shift several picking tubes as a group, for example all picking tubes in one vertical column.

As an example of a specific program selection, it might be desired for picking a particular type of cotton to have the middle picking units of the leading column operating more frequently than the top and bottom units, while the last column of the machine had all its units operating at the same rate, but more rapidly. The variable speed motor provides an overall control which may be varied in accordance with the speed at which the machine is driven along the row, or with the density of cotton on the plants at different positions along the row.

It will be understood that the switches shown in FIGS. 17 and 18 are merely illustrative, and that electronic switching techniques may be employed if preferred, for example by substituting free running multivibrators for the cam disks and transistors or relays for the lever switches.

FIG. 15 shows schematically in plan an arrangement involving a plurality of fixedly projecting picking tubes, to which the application of suction may be controlled by such a cell as 50a of, e.g. FIG. 14. In FIG. 15 a conveyance is outlined at 20, assumed to be travelling in the direction indicated. A plurality of tubes 480, here indicated as being merely the outer tubular parts of tube 48 of FIG. 12, are directly and fixedly connected with suction manifold 401 so that vacuum is always present in the tubes out to the solenoid actuated valves located in valve casings 431 as in FIG. 12. A scanning cell is carried in each of the beam restricting tubes 52a, as in FIG. 14. In a horizontal row of such tubes the projections from the side of the conveyance varies in dimension, as indicated; and the projecting tubes may angle back from the direction of conveyance progress. In practice there will be a suitable number of vertically spaced horizontal rows of such tubes. When, in progress along a row of plants a lock of cotton comes at or near an open tube end, the associated cell reacts and causes the vacuum valve to open, drawing the cotton in. In this arrangement, as well as in the scanning cell arrangements shown in FIGS. 13 and 14, the cell sensitivity, or its circuit reaction, may be calibrated to cause solenoid energization sufficient to open the suction valve only when a lock of cotton is at or sufficiently near the open tube end to be drawn in. For example, a calibrated resistance in series with the solenoid winding may be used; or the solenoid winding itself may provide the calibrated resistance.

FIG. 15 also shows, in addition to the cells 50a carried on the ends of the suction tubes, cells 50aa in beam restricting tubes 52aa mounted on the vehicle in the same relation to the suction tubes as the relation shown in FIG. 3 for cell 50 and its tube 52. Either or both cells 50a and 50aa may be incorporated in such a system as shown in FIG. 15. In such case, there being no cell controlling tube projection, cells 50a and/or cells 50aa may be incorporated in the control circuiting of FIG. 16 either in the circuit location shown there for cell 50 or that shown there for cell 50a. For example, if cells 50aa and 50a of FIG. 15 are incorporated in FIG. 16 at 50 and 50a, respectively, solenoid 85 being omitted, valve solenoid 444 is energized under joint control of the two photocells only when both photocells simultaneously "see" exposed cotton, due to the series connection of switches S1 and S3. By connecting those switches in parallel between power source 164 and solenoid 444, the latter is energized under joint control whenever either of the photocells "sees" cotton. If cells 50aa and 50a of FIG. 15 are circuit incorporated in FIG. 16 either in series or in parallel at the position of cell 50, circuitry 150 of FIG. 16 is omitted and solenoid winding 85 of that figure becomes the solenoid winding 444 of the vacuum controlling valves.

It is remarked here that photocells such as shown at 50 in FIGS. 3, 13 and 14, and at 50aa in FIG. 15, and also the scanning cells shown at 50a in FIGS. 13 and 14, and the cells in the tubes 52a of FIG. 15, are all restrictedly beamed along lines in the vicinity of the outer ends of the associated suction tubes.

It is remarked that the vacuum chambers of e.g., FIGS. 1 to 6 are functionally vacuum conduits or manifolds, functioning to transmit the suction stream from the picking tubes in the same manner as do the conduits or manifolds 400, 401 of FIGS. 11–15. As mentioned before, one of the distinctions of e.g., FIGS. 11, 12, is the offset relation between such a conduit or manifold and the picking tube unit.

It will be understood without extended comment that the system as described will recover cotton entangled in the plants as well as that in the bolls. And it will also be understood that although this description has been particularly about cotton recovery, the recovery of any other plant product is merely conditioned on selective sensitivity of the photocell or photocells to that particular product. And for recovery of any product from the ground where it may have fallen, it is only necessary that the systems here described be oriented downwardly under a conveyance. In fact, on reasonably level ground, the suction tubes instead of being projectible may all project down to a given level, with their vacuum controlling valves controlled by cells, mounted, say, as in FIGS. 14, 15, and which react whenever the open end of a suction tube approaches the selected grounded product.

FIG. 16 is a schematic diagram of an illustrative electrical system for controlling action of a picking unit in response to photoelectric signals. Such a system is provided for each picking unit, except that all may utilize a common power source. The upper portion of FIG. 16 shows photocell 50, already described, and circuitry for energizing valve solenoid 85 in response to incidence of light from a cotton lock upon the photocell. The lower portion of FIG. 16 indicated generally within the outline 150, comprises the scanning photocell 50a and circuitry whereby that cell may control admission of vacuum into the picking tube via a vacuum valve actuated by such a solenoid as 444. If the vacuum is not controlled by an auxiliary scanning photocell, but in one of the manners already described, the entire circuitry 150 is omitted.

Photocell 50 is shown illustratively as a photoconductive cell of conventional type having a resistance that is high when the cell is dark and that decreases essentially linearly with increasing illumination of the cell. Cell 50 is connected in series with the resistance R1 across a source of direct current voltage, shown as the battery 160, with the polarity shown. That battery typically produces 135 volts and is tapped to provide intermediate voltage values as desired. The voltage of junction 162 then varies with the resistance of the photoconductive cell, providing a voltage signal that represents the illumination of the cell.

That signal is amplified by the two-stage amplifier comprising the transistors $Tr1$ and $Tr2$ of PNP type connected in a conventional common collector circuit with the winding K1 of the relay Ry1 as output load. The system is so biased that with photocell 50 exposed to the normal background of illuminated cotton plants both transistors are cut off and the relay is idle. When the cell "sees" a white cotton area, junction 162 becomes more negative, switching transistor Tr1 to conductive condition in response to a white area of predetermined size, typically a small fraction of a normal cotton boll. Tr2 then draws current thru K1, actuating the relay.

Relay Ry1 includes the normally open switch S1 and the normally closed switch S2. S1 is connected in series with a suitable power source 164 and the solenoid winding 85 of air valve 80. Hence relay actuation directly operates that valve, projecting the picking tube as already described. On relay deactuation, as when photocell 50 no longer sees a cotton lock, solenoid 85 is idled, retracting the picking tube to normal rest position ready for another operation. The tube is normally retracted in that manner when the cotton is picked or when it otherwise disappears from the field of the photocell.

If the cotton distribution is dense, a second lock may come into the field of view of photocell 50 before the initial lock is picked, tending to maintain the picking tube continuously in extended position. That would limit the picking range of the tube to its extreme reach, leaving nearer locks unpicked; and would also tend to carry the branches of the cotton plant along with it as the machine moves along the row, damaging the plants. Such difficulties are avoided by providing a time control that overrides the normal photocell control, returning the picking tube to normal position after a set interval following each projection. In the present system that over-ride action is timed by a timing circuit under control of relay switch S2. That circuit utilizes the time constant of a resistance and charging capacitor in series, and applies a control signal directly to the base of second stage transistor Tr2.

When relay Ry1 is idle with S2 closed, the voltage dividing resistances R3 and R4 are connected in series across battery 160. The junction 172 of R3 and R4 is connected to the base of Tr2 via the diode D1 with the polarity shown. The components are selected to make junction 172 normally more negative than the transistor base, the diode then isolating the transistor. The capacitor C1 and resistor R5 are series connected in shunt to R4 and S2. In idle condition of the system C1 is charged to a potential equal to the voltage drop across R4. The capacitance C2 is preferably connected as shown for reasons to be described below.

At the start of a picking operation, relay actuation opens the direct connection of R4 to the negative battery terminal, but leaves the network C1, C2 and R4 in series with R3 and R5 across the battery. Hence C1 begins to charge through R3 and R5, and C2 charges through those resistances in series with R4. The potential of junction 172 thus approaches that of the positive battery terminal. As soon as that junction becomes more positive than the base of Tr2, diode D1 conducts, tying the base potential to 172 and over-riding the normal control via Tr1 and photocell 50. As junction 172 reaches a critical potential, transistor Tr2 is cut off, releasing the relay. By suitable selection of the charging time constant of C1 and C2 with respect to the constants of the system, the maximum dwell time of the picking tube in extended position can be set at any desired value. A dwell time of about ¼ second is illustrative.

Presence of R5 prevents excessive loading of R3 during the charging of C1. The distribution of the effective capacitance between C1 and C2 tends to stabilize the system against relay oscillation. Presence of C2 also accelerates the return of the system to normal rest condition following release of the relay. Closure of switch S2 may be viewed as shifting capacitors C1 and C2 from parallel connection with both capacitors charged to series connection with their directions of charge opposed. The charges are thereby partially neutralized, restoring junction 172 to its rest potential with minimum delay. The system is thus returned promptly to control by photocell 50, ready for another picking cycle.

When an auxiliary photocell 50a is employed to control the vacuum valve, the signal from that photocell is typically amplified in conventional manner for supply to the relay Ry2 controlling the valve solenoid. As illustratively shown at 150, photocell 50a is connected in series with the resistance R8 across battery 160, and the junction is coupled to the two stage amplifier Tr3, Tr4 which is essentially identical with the amplifier already described. The relay Ry2 has its winding K2 connected as output load of the amplifier, and controls energization of vacuum valve solenoid 444 via the single normally open relay switch S3. The valve is thereby opened, applying vacuum to the interior of the picking tube as the tube end reaches the cotton boll. On disappearance of the boll into the picking tube, and auxiliary phototube is again darkened, shutting off the vacuum.

The field of view of auxiliary photocell 50a is typically narrower than that of the primary photocell that initiates projection of the picking tube. It is therefore less likely that the auxiliary tube will continue to see white after a cotton lock has been picked. However, if desired, a timing control similar to that already described may be provided in circuit 150 to limit the maximum time that the vacuum valve can remain open following each relay actuation. In the circuit as shown in FIG. 16, such time limitation is provided for solenoid 444 by the timing circuitry that was described in connection with solenoid 85, since switch S3 receives power from source 164 only when Ry1 is actuated. If that interlock between the two types of actuation is not desired, the upper terminal of S3 can be connected directly to power source 164. Suction can then be applied to the picking tube independently of its projection. It is then usually desirable to provide circuitry 150 with its own time control.

Figure 19:
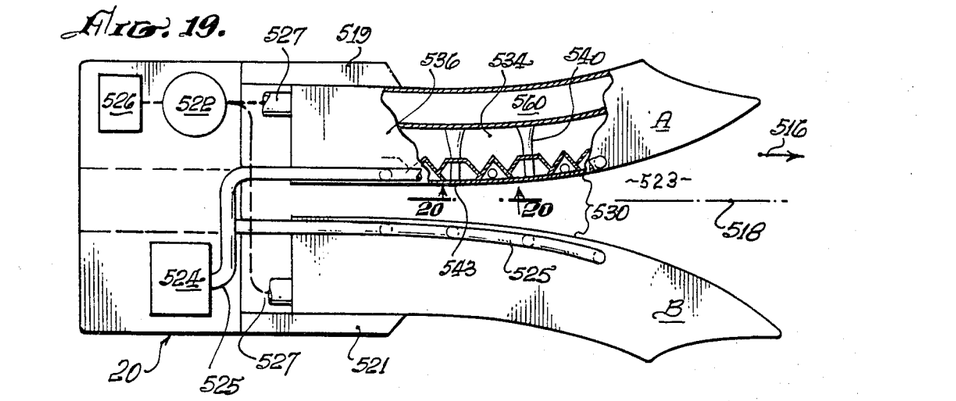
FIG. 19 is a schematic plan illustrating a further manner of carrying out the invention.

FIG. 19 illustrates schematically in plan a conveyance 20 which is propelled, by mechanism not explicitly shown, in the direction of arrow 516 along and over a row of plants 518. The two picking assemblies A and B may be essentially duplicates and are structurally mounted on conveyance 20 by framing shown schematically at 519 and 521. The two assemblies are mounted on opposite sides of row 518 with their oblique opposing sidewalls 530 forming a converging tunnel 523 in which the plants are compressed laterally as the machine advances. Suction tubes 540 for recovering the plant product are mounted in vertical columns with their outer, product receiving mouths opening in flush relation through the walls 530 and with their inner, delivery ends opening into the product receiving chambers 560, a single such receiver typically serving all tubes of each assembly A and B. The gathered cotton is removed from receivers 560 to the large storage basket indicated schematically at 526 by any suitable means, such as the conduits 527 and the blower indicated at 522. Compressed air for operating suction tubes 540 is supplied at relatively high pressure, for example from 60 to 80 p.s.i. from a suitable air compressor 524 via the lines 525 and the header chambers 542, each of which serves a column of tubes.

Figures 20, 21, 22:
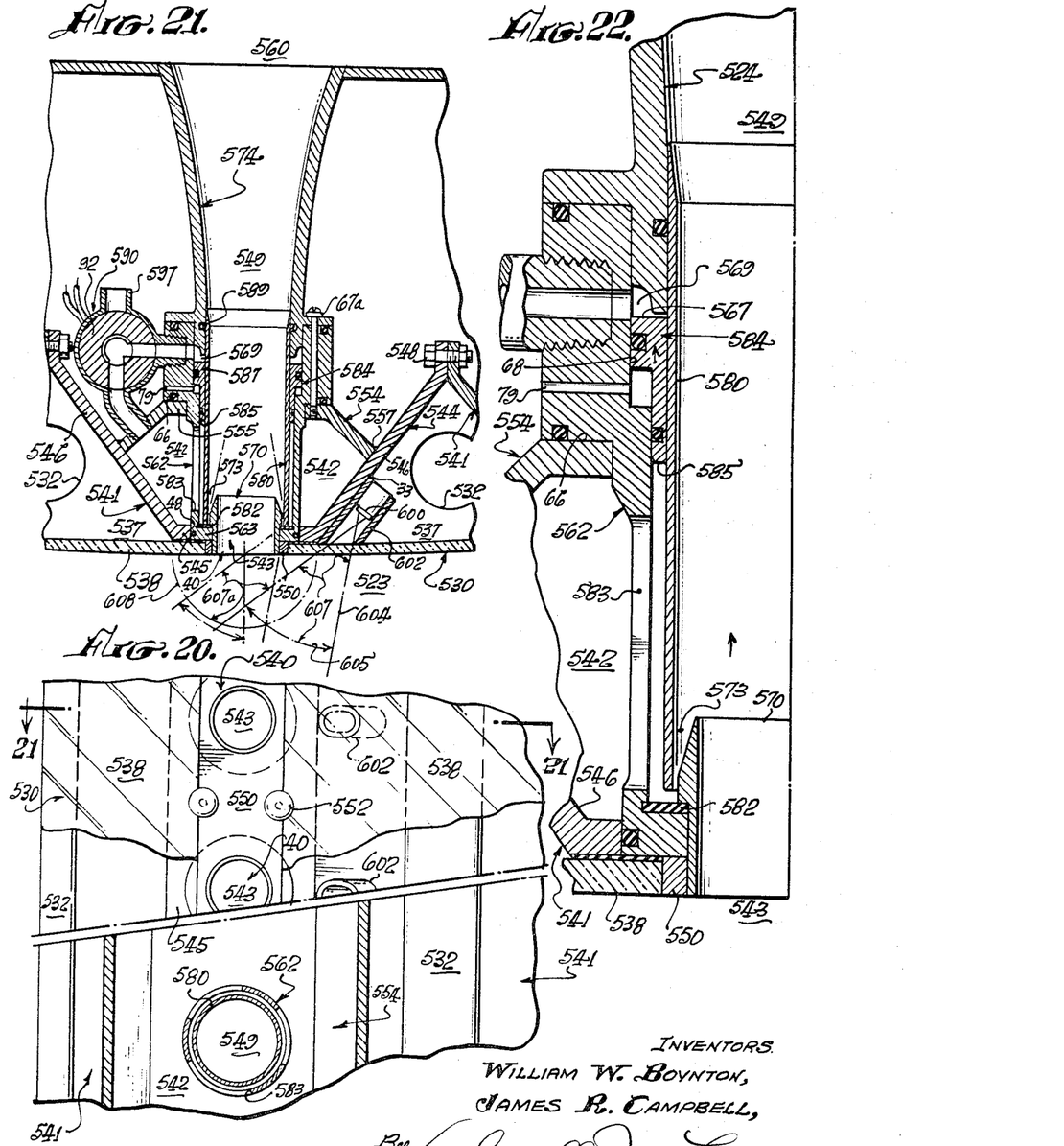
FIG. 20 is a fragmentary section at enlarged scale on line 20—20 of FIG. 19.
FIG. 21 is a section on line 21—21 of FIG. 20.
FIG. 22 is an enlarged detail of FIG. 21.

As shown in FIGS. 20 and 21, each column of picking tubes 540 is mounted on a column structure 541 comprising an assembly of two column members 544 and 554, both of oblique channel section. The channels are welded together at 557 with their webs 545 and 555 in parallel opposed relation and enclose the vertical header chamber 542. Those chambers are closed at their ends by cover plates 534 and 536 (FIG. 19). The flanges 546 of main column members 544 extend rearwardly from tunnel wall 530 at an oblique angle, with the flange edges of adjacent columns connected by the bolts 548 to form a rigid frame assembly. Wall 530 comprises the windows 538, mounted against the outer web faces of channels 544, as by the flat-headed screws 552. Mutually adjacent windows may abut directly, but are shown spaced apart by the flush spacer strips 550, which are mounted on the column webs and form a smooth wall surface effectively continuous with the windows.

The lamps 532 are mounted by means of conventional fittings behind the respective windows 538 in the chambers 537 formed by those windows and the column flanges 546. Those flanges may be chrome plated or coated with white enamel to enhance the light transmitted through the windows 538 into the plant tunnel 523. A photocell 600 is mounted adjacent each picking tube 540 in a suitable beam restricting housing 602 behind the window 538, and is directed through that window toward the portion of tunnel 523 in front of the associated picking tube. Housing 602, aided by lenses if desired, limits the input light to the photocell to a generally conical beam such as is indicated at 604. Additional baffles may be provided as needed to prevent stray light from reaching the photocells from sources other than bodies within tunnel 523. For picking cotton, lamps 532 are blue fluorescent lamps with high emission in the blue and blue-green portions of the spectrum, and the photocells are preferably cadmium sulphide photo-resistive cells, which have a sharp response peak at approximately 5,000 angstroms.

The sensitivity of each photocell 600 and its electrical control and amplifying circuit is so selected or adjusted, with respect to the light intensity provided by lamps 532, that the effective response of the photocell to an exposed cotton area of normal size is limited to a definite range, indicated illustratively and somewhat schematically in FIG. 21 by the arc 605. The response region 607 within beam 604 and range 605 is preferably offset from the axis 561 of the associated picking tube in the direction of travel of the machine (to the right as shown in FIG. 21) to compensate for the short time delay between initial sensing of the cotton and full operation of the tube. At the end of that delay time, the photocell response region 607 has moved typically to the position indicated as 607a. Taking that delay into account, response region 607 predominantly coincides with the region, indicated schematically at 608, within which the picking tube is capable of plucking cotton from a ripe boll.

Each suction tube 540 comprises the cage body 562, which is releasably mounted on column 541 in alined bores in channel webs 545 and 555. The picking orifice 543 is defined by the short sleeve member 570, which is mounted in the internal flange 563 at the forward end of cage body 562 and projects in flush relation through a clearance bore in spacer strip 550. The delivery tube 574 is mounted at the rearward end of cage body 562 and defines the flaring delivery portion of picking passage 549. The intermediate portion of that passage is defined by the sleeve 580, which also acts as control valve for controlling the picking action of the tube. The valve seat comprises an annular element 582 of neoprene or other rubber-like material mounted against forward flange 563 of the cage body and engaged by the forward edge of sleeve 580. The valve is directly exposed to the full pressure in header chamber 542 through the slots 583 in the cage body wall. With the valve open as shown in FIG. 22, pressurized air is discharged rearwardly into passage 549 as an annular jet defined by the jet nozzle 573 formed between valve sleeve 580 and the conically tapered inner end of sleeve 570. That jet produces a partial vacuum at the forward end of the picking tube, drawing air rapidly inward through orifice 543 from tunnel 523.

The valve action is controlled pneumatically by the piston structure 584, effectively integral with sleeve valve 580, and by the solenoid controlled pilot valve 590, shown illustratively as a rotary valve. Pressurized air from header chamber 542 acts continuously on the relatively small piston face 585, tending to open the valve. When pilot valve 590 is in the normal position shown in FIG. 21, air from header chamber 542 is also admitted to the annular cylinder 569, defined by a counterbore in cage body 562 and by the forward end of delivery tube 574, exerting on the relatively large piston face 587 a force that outweighs that on face 585, firmly driving sleeve valve 580 forward against valve seat 582. When the pilot valve is shifted 90 degrees counterclockwise from the position shown in FIG. 21 in response to an electrical signal from photocell 600, cylinder 569 is cut off from header 542 and is connected to atmospheric pressure via 597. Continuing pressure on piston face 585 then opens sleeve valve 580, injecting air into the picking passage as already described.

When the described structure, essentially the full pressure in header chamber 542 is delivered to the injector jet 573, producing inward flow through orifice sleeve 70 at extremely high flow rate, believed to reach virtually sonic velocity at the sleeve axis. Under that condition cotton is attracted strongly enough to pluck it directly from the pod even when spaced from orifice 543 by an appreciable range. The actual attainable picking range depends somewhat on the angle from the tube axis and varies with the detailed conformation of orifice 543 and with other engineering factors. In general the effective picking range equals at least about the orifice diameter, and that illustrative range is represented schematically in FIG. 19 by the arc 608.

Production of an effective range of that order for plucking cotton out of the boll requires expenditure of power in the suction tube at what can only be called a lavish rate. For example, each minute of such flow for a single picking orifice of injector type and of only 0.6 square inch area typically requires delivery to the injector nozzle of about 90 cubic feet of free air that has been compressed to a pressure of 60 to 80 p.s.i. For a typical machine with 70 picking orifices operating continuously, some 1,500 horsepower would be required to provide the necessary 6,300 c.f.m. of air. In the previously described embodiments, in which suction flow is produced by direct connection of the inner end of the suction tube to an evacuated chamber, the power requirement for maintaining adequate vacuum in that chamber to produce an effective picking range with continuous operation would be only slightly less. Any such rate of power consumption is obviously entirely impracticable.

The present invention makes such lavish rates of energy consumption feasible by limiting the air flow to very short pulses, each having the minimum duration required for a single picking action. Ripe cotton is detected by a sensor having an effective response region, such as 607a in FIG. 21, that is predominantly coextensive with the effective picking region of an individual picking unit, shown typically at 608. Power expenditure in each picking tube then occurs only in response to actual presence of exposed cotton essentially within the effective picking region for that tube. The power expenditure is terminated as soon as the detected cotton is drawn into the tube, or may be terminated by timing circuitry even before that. By thus reducing the "on time" of each picking tube to a series of spaced intervals, typically averaging only 0.05 second in length and spaced 2.5 seconds apart, the average rate of powder consumption per picking unit is reduced by a factor of the order of 50. The figure of 1,500 horsepower mentioned above for continuous operation of a 70-unit machine is thereby reduced to an average consumption of about 30 HP. Those illustrative figures assume machine operation at an average rate of 1680 individual picking actions per minute, or a theoretical yield of 1680 bolls or about 27 lbs. of seed cotton per minute. Even with ample allowance for departure from full theoretical yield, that power requirement is entirely practicable.

We claim:

1. In combination with a machine for automatically harvesting cotton from a row of cotton plants carrying ripe cotton bolls, said machine comprising a conveyance adapted to travel along the row, structure on the conveyance forming a plurality of picking orifices arranged in a predetermined pattern and opening outwardly toward the row in such position that cotton bolls have relative movement past the orifices, and power means for producing inward air flow through said orifices; the improvement that comprises control means for each individual orifice normally disabling said power means from producing air flow with respect to that one orifice, and actuable to enable production of air flow therein, said power means being capable, upon actuation of the control means for an individual orifice, of producing air flow through that one orifice at an instantaneous flow rate sufficient to pluck from a ripe boll cotton that is spaced from that orifice within a predetermined picking region, sensing means associated with each individual orifice and responsive selectively to exposed ripe cotton only within a restricted field of response that predominantly coincides with said picking region for that one orifice, each sensing means acting automatically to develop a signal in response to presence of exposed cotton within said field of response, and means for automatically actuating the control means for each individual orifice in response to such signal developed by the sensing means associated with that one orifice to produce inward air flow therein at substantially said flow rate.

2. The combination defined in claim 1, and in which said picking range for each orifice extends outwardly from the orifice a distance at least about equal to the orifice diameter.

3. The combination defined in claim 1, and in which said sensing means comprise cadmium sulphide photoresistive elements having maximum response at approximately 5000 angstroms and associated with the respective said orifices, means for producing light having high intensity in the spectral region of said response maximum of the photoresistive elements, and means limiting the common region of effectiveness the light producing means and of each said photoresistive element to said field of response for the orifice associated with that element.

4. The combination defined in claim 1, and including also timing means acting to terminate said air flow after a predetermined time interval.

5. The combination defined in claim 1, and in which said picking orifices are carried on respective hollow structures that are movable to project the respective orifices outwardly toward the row, said combination including also means for driving said structures to intermittently project the orifices.

6. The combination defined in claim 5, and including also means for causing the field of response for each said sensing means to move substantially with the projection movement of the associated orifice.

7. The combination defined in claim 5, and in which said structure driving means comprise means for driving the structures periodically with variable period, the duration of each projection movement being independent of the period.

8. The combination defined in claim 5, and in which said structure driving means comprise means for producing a plurality of sets of periodic timing signals having different periods of repetition, means for driving each of said orifices intermittently in response to input signals, and means for selectively supplying as input signal to each of the last said driving means any selected one of said sets of timing signals.

9. The combination defined in claim 1, and in which said sensing means for each individual orifice comprise two radiation responsive elements that are restrictively beamed along respective lines that essentially cross within the said picking region of that one orifice and that act jointly to develop said signal.

10. A machine as defined in claim 1, and in which said conveyance includes a wall extending generally longitudinally of the direction of travel with its outer face toward said fruit, and a plurality of elongated formations extending obliquely outwardly and rearwardly from the wall for respective distances that are non-uniform and increase generally toward the rear of the conveyance, a said picking orifice being formed at the outer end of each such formation.

11. A machine for recovery of plant fruit comprising in combination a conveyance adapted to travel a path along the location of such fruit, structure carried by such conveyance and forming a picking orifice that is directed outwardly toward such fruit, sensing means mounted on the conveyance and producing an electrical signal selectively in response to presence of such fruit within a predetermined critical region outwardly adjacent said orifice, flow means actuable to produce inward suction flow in the orifice at a velocity sufficient to pick substantially any such fruit that is within said critical region, control means for normally actuating the flow means in response to said signal and for disabling the flow means in response to termination of said signal, and means acting to override the control means and to disable the flow means after a predetermined time period independently of said signal.

12. A machine for recovery of plant fruit, comprising in combination a conveyance adapted to travel a path along the location of such fruit, structure forming a plurality of picking orifices carried by the conveyance and arranged in a predetermined pattern and opening outwardly laterally of the path of travel of the conveyance, a normally closed valve associated individually with each said picking orifice, power means on the conveyance for maintaining a difference of air pressure across all said valves in parallel, normally essentially without air flow, intermittent opening of a valve causing inward suction flow only in the associated picking orifice, a plurality of radiation responsive elements carried by the conveyance and selectively responsive to radiation reflected by such fruit, means restricting each said element to limit its response to fruit that is outwardly adjacent only one of said picking orifices, and means for automatically opening the valve for each individual picking orifice under selective control of such response by the radiation responsive element associated with that individual picking orifice.

13. A machine as defined in claim 12, and in which each said valve opening means includes means for closing the associated valve after a predetermined open time.

14. A machine as defined in claim 12 and including also a second plurality of radiation responsive elements carried by the conveyance and selectively responsive to radiation reflected by such fruit, and means restricting each of the last said elements to limit its response to fruit that is outwardly adjacent only one of said picking orifices, the pair of elements so associated with an individual picking orifice being differently directed, said valve opening means for each orifice that has such a pair of associated elements acting under joint control of that pair of elements.

15. A machine as defined in claim 12, and in which said conveyance includes a wall extending generally longitudinally of the direction of travel with its outer face toward said fruit, and a plurality of elongated formations extending obliquely outwardly and rearwardly from the wall,
a said picking orifice being formed at the outer end of each such formation.

16. A machine for recovery of fruit comprising in combination
a conveyance adapted to travel a path along the location of such fruit,
structure forming a plurality of picking orifices normally without suction flow therein mounted on the conveyance and arranged in a predetermined pattern and opening outwardly toward such fruit,
means for selectively and independently actuating the individual picking orifices to produce inward suction flow therein to draw into an actuated orifice any such fruit that is present within a critical region of predetermined dimensions outwardly adjacent said orifice,
structure forming a radiation source for irradiating the vicinity of each picking orifice with radiation predominantly of a wavelength region that is selectively reflected by said fruit,
a radiation responsive element for each individual picking orifice mounted in definite spatial relation to said critical region for that orifice, each such element having a response peak within said wavelength region,
said actuating means for each picking orifice including circuit means interconnected with the corresponding radiation responsive element and adjustably calibrated to cause orifice actuation in response to radiation reflected by such fruit only when the latter is essentially within said critical region for the orifice.

17. A system for recovery of fruit comprising in combination
a conveyance adapted to travel a path along the location of such fruit,
a suction tube with an outer open fruit receiving end carried by such conveyance and projectable along a line of projection transverse of the path of travel of the conveyance,
means for applying inward suction flow to the tube,
a radiation responsive element carried by the conveyance and restrictedly beamed along a line in the vicinity of the outer open end of the suction tube, said element being selectively responsive to radiation reflected by such fruit,
means controlled by such response of said element and acting to project the tube,
and means for controlling application of inward suction flow to the tube, said means actuated by virtue of tube projection.

18. A system as defined in claim 17, and in which said suction flow controlling means comprise
inertial means mounted with respect to the tube for movement relative thereto in response to projection and retraction of the tube,
and valve means actuated in response to said relative movement of the inertial means and acting to control application of inward suction flow to the tube.

19. A system as defined in claim 18, and including also
abutment means engageable with the valve means in retracted position of the tube to hold the valve means closed.

20. A system for recovery of fruit comprising in combination
a conveyance adapted to travel a path along the location of such fruit,
a suction tube with an outer open fruit receiving end and projectable outwardly along a line lateral of the path of travel of said conveyance,
a piston and cylinder unit connected to the tube to project and retract it,
means selectively responsive to a fruit approaching such line of projection and acting to control pressure application to the piston and cylinder unit to project the tube on such response and to retract the tube in the absence of such response,
and valvular control of application of inward suction flow to the tube, said valvular control actuated by virtue of projection and retraction of the tube.

21. A system as defined in claim 20, and in which said valvular control comprises
valve means actuable in response to applied pressure for control of application of inward suction flow to the tube,
and conduit means interconnecting the valve means and said piston and cylinder unit for supplying operating pressure to the valve means in response to said pressure application to the piston and cylinder unit.

22. A system for recovery of fruit comprising in combination
a conveyance adapted to travel a path along the location of such fruit,
a vacuum conduit mounted on the conveyance,
means for maintaining a subatmospheric pressure in the conduit,
a plurality of suction tubes projecting through a wall of the conduit and having respective fruit receiving orifices outside of the conduit, each tube being axially slidable in sealed relation with the conduit wall to project the orifice toward the fruit,
means for intermittently driving the tubes in said sliding movement,
and a plurality of normally closed valve means normally isolating the respective tube orifices from the interior of the vacuum conduit, each said valve means being independently actuable to permit substantially free air flow inward through its orifice and into the conduit.

23. A system as defined in claim 22, and in which
each said valve means is adjacent its tube orifice and a predominant portion of the interior of the tube communicates continuously with the conduit.

24. A system as defined in claim 22, and in which
each said valve means comprises structure mounted within the vacuum conduit and forming a valve seat, and a valve sleeve at the inner end of the suction tube adapted to engage the valve seat when the tube is retracted.

25. A system as defined in claim 24, and in which
said valve sleeve is axially movable in sealed relation with respect to the suction tube and frictionally related thereto, the inner end of the sleeve being adapted to abut the valve seat.

26. A system for recovery of fruit comprising in combination
a conveyance adapted to travel a path along the location of such fruit,
a suction tube with an outer open fruit receiving end carried by such conveyance and projectible along a line of projection transverse of the path of travel of the conveyance,
means for applying inward suction flow to the tube,
a radiation responsive element carried by the conveyance and restrictedly beamed along a line in the vicinity of the outer open end of the suction tube, said element being selectively responsive to radiation reflected by such fruit,
means controlled by such response of said element and acting to project the tube, and mean for controlling application of inward suction flow to the tube, said means actuated by virtue of approach of said open tube end to a fruit.

27. A system as defined in claim 26, and in which said flow controlling means comprise
 a second radiation responsive element restrictedly beamed in the vicinity of said tube end and selectively responsive to the light reflected from such fruit,
 valvular means controlling application of inward suction flow to the tube,
 and means controlled by said second radiation responsive element and acting to open said valvular means upon such response of said second element and to close said valvular means in absence of such response.

28. A system as defined in claim 27, and in which said second radiation responsive element is restrictedly beamed along a line that is transverse of the line of tube projection and that is laterally shiftable in response to tube projection to maintain substantially uniform spatial relation to the outer tube end.

29. A system as defined in claim 26, and in which said tube projecting means comprise
 a piston and cylinder unit connected to the tube to project and retract it,
 and means actuable to control pressure application to the piston and cylinder unit to project the tube on said response of the radiation responsive element and to retract the tube in the absence of such response.

30. A system for recovery of fruit comprising in combination
 a conveyance adapted to travel a path along the location of such fruit,
 a plurality of suction tubes having respective outer fruit receiving ends and mounted on the conveyance for axial projection laterally of the path of travel of said conveyance,
 means actuable to project and retract said suction tubes,
 a radiation responsive element for each tube restrictedly beamed along a line in the vicinity of the outer end of that tube, said elements being selectively responsive to radiation reflected by such fruit,
 and means for selectively and independently actuating each tube to produce inward suction flow therein under selective control of such response of the corresponding radiation responsive element.

31. A system as defined in claim 30 in which said line of beaming of each radiation responsive element is transverse of the tube axis and is movable with said projection movement of the tube.

32. A system as defined in claim 30 and in which said radiation responsive elements are carried by the respective suction tubes.

33. A system as defined in claim 30, and in which said tube projecting and retracting means comprise
 means for producing a plurality of sets of periodic timing signals having different periods of repetition,
 means for independently projecting and retracting each one of at least a plurality of said suction tubes in response to respective input signals,
 and means for selectively supplying as input signals to each of the last said means any selected one of said sets of timing signals.

34. A system for recovery of fruit comprising in combination
 a conveyance adapted to travel a path along the location of said fruit,
 a plurality of normally idle suction tubes mounted on the conveyance and having respective outer fruit receiving ends, said suction tubes having normal idle positions and being projectible outwardly therefrom,
 normally closed valve means associated with each suction tube,
 power means on the conveyance for maintaining a difference of air pressure across all said valve means in parallel, normally essentially without air flow, intermittent opening of a valve means causing inward suction flow only in the associated suction tube,
 means actuable to intermittently project the respective tubes,
 and control means for the valve means of each suction tube acting to open that valve means intermittently in response to projection of the tube.

35. A system as defined in claim 34, and in which said projection movement of each suction tube includes initial and final portions,
 said control means acting to open the valve means during the initial portion of the tube projection movement.

36. A system as defined in claim 34, and in which each said valve means comprises a valve member normally in valve closing position and movable to valve opening position,
 and each said control means comprises means movably mounting the valve member on the suction tube,
 and each said control means comprises means movably mounting the valve member on the suction tube for relative movement to valve opening position by virtue of said tube projection movement.

37. A system for recovery of fruit comprising in combination
 a conveyance adapted to travel a path along the location of said fruit,
 a plurality of normally idle suction tubes mounted on the conveyance and having respective outer fruit receiving ends, said suction tubes having normal idle positions and being projectible outwardly therefrom and retractible thereto,
 normally closed valve means associated with each suction tube,
 power means on the conveyance for maintaining a difference of air pressure across all said valve means in parallel, normally essentially without airflow, opening of a valve means causing inward suction flow only in the associated suction tube,
 and means actuable intermittently to project the respective suction tubes and then to retract the same to idle position,
 each valve means comprising a valve member movable axially with respect to its suction tube between a relatively outward valve closing position and a relatively inward valve opening position, inertia of the valve member during tube projection tending to open the valve means, and inertia of the valve member during tube retraction tending to close the valve means.

References Cited

UNITED STATES PATENTS

| | | | |
|---|---|---|---|
| 1,711,316 | 4/1929 | Higgins | 56—12 |
| 2,088,676 | 8/1937 | White | 56—14 |
| 2,403,399 | 12/1938 | Connolly | 56—30 |
| 2,653,438 | 9/1953 | Ramirez | 56—32 |
| 2,688,835 | 9/1954 | Rawson | 56—13 |
| 2,734,628 | 2/1956 | Schlayer | 209—111.7 |
| 2,736,151 | 2/1956 | McKenzie | 56—13 |
| 2,912,810 | 11/1959 | Lense | 56—1 |

ABRAHAM G. STONE, *Primary Examiner.*

P. A. RAZZANO, *Assistant Examiner.*